P. R. BANNON.
FLEXIBLE RACK BAR.
APPLICATION FILED JUNE 3, 1912.
1,187,597.
Patented June 20, 1916.
3 SHEETS—SHEET 3.
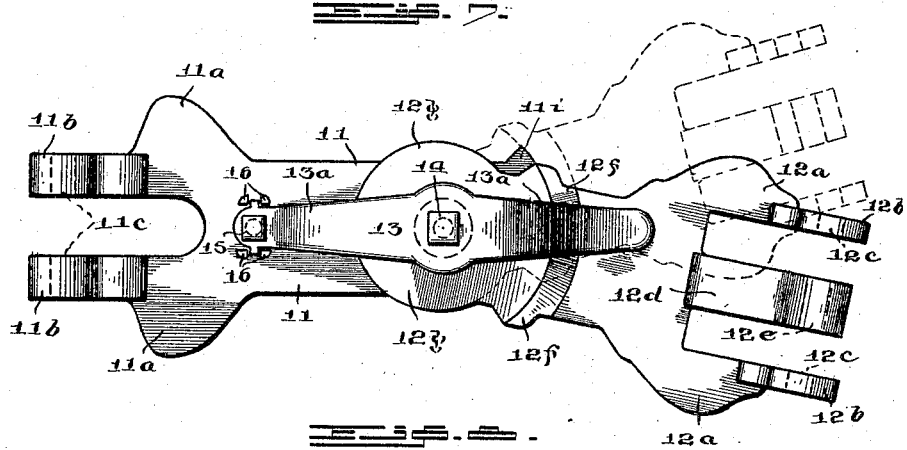
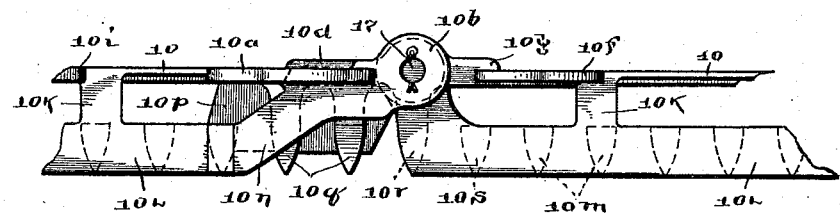
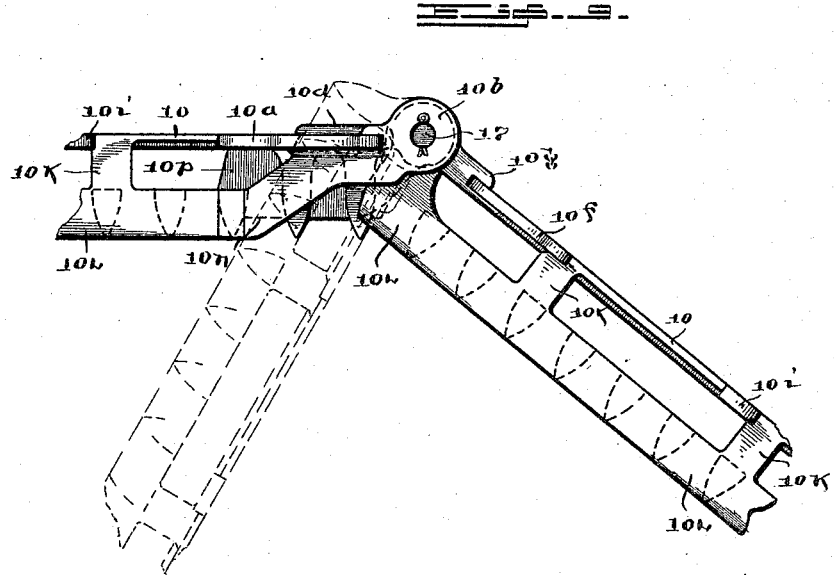

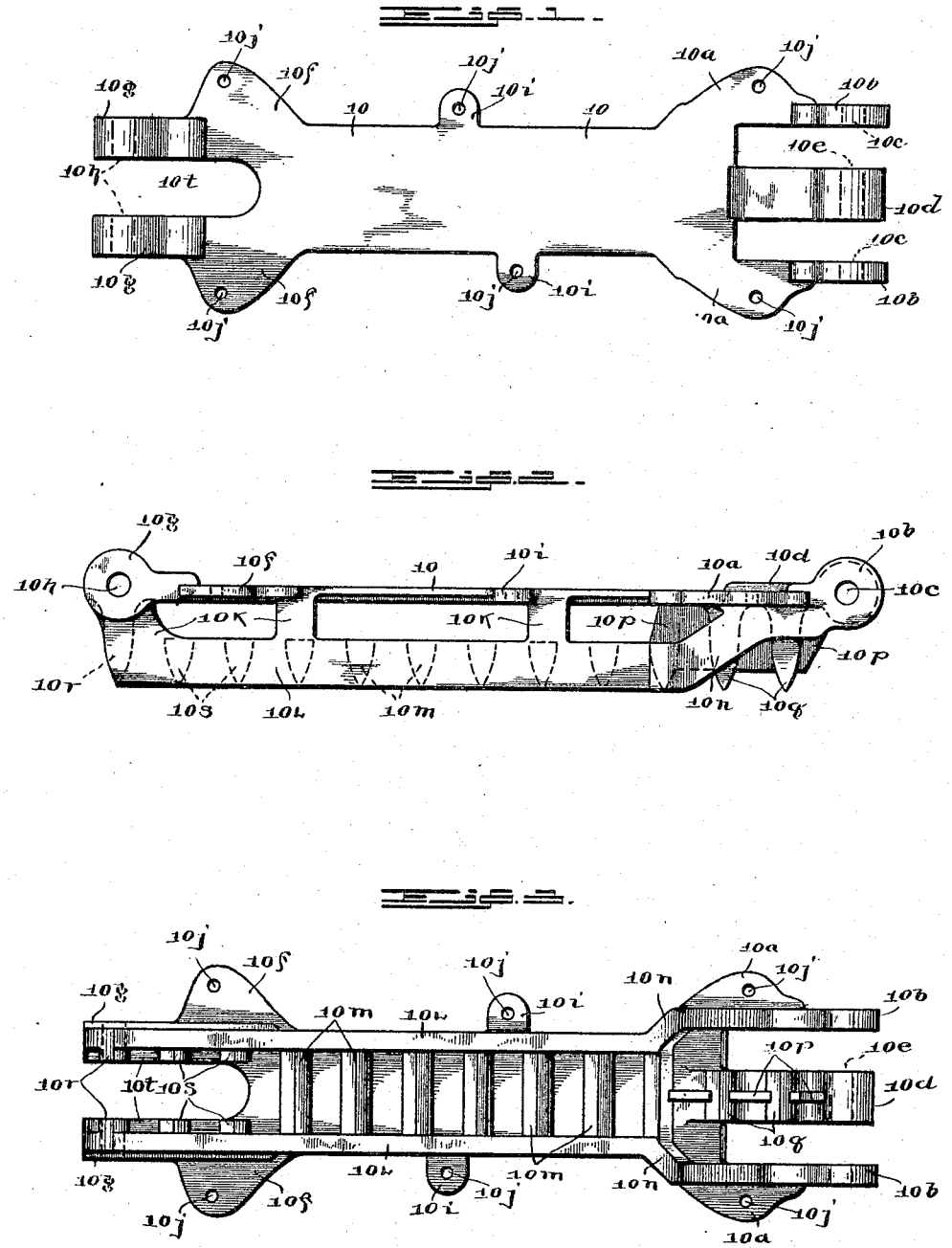

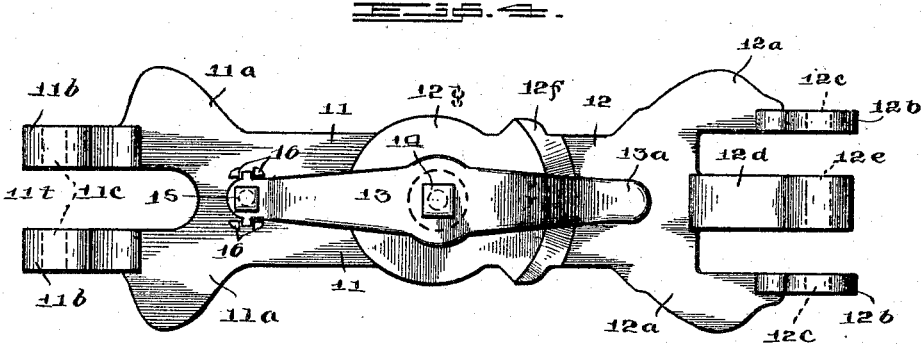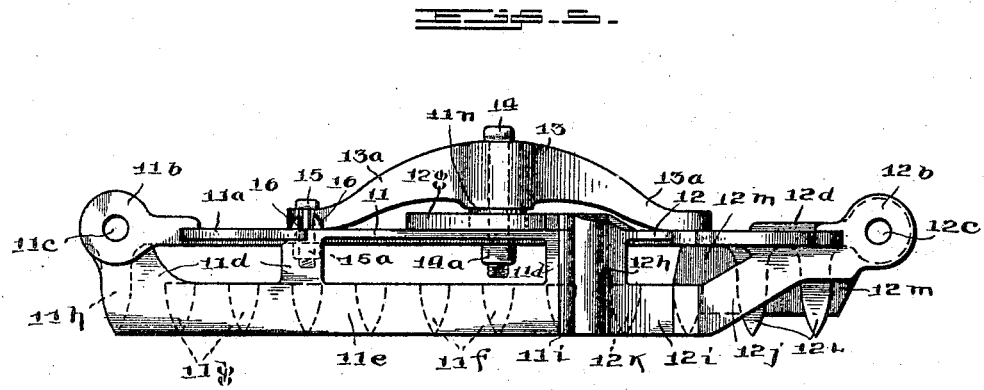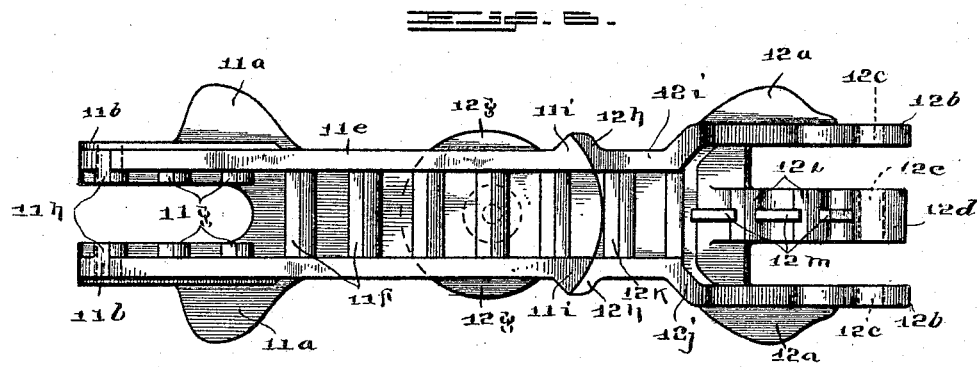

UNITED STATES PATENT OFFICE.

PATRICK R. BANNON, OF JOLIET, ILLINOIS.

FLEXIBLE RACK-BAR.

1,187,597. Specification of Letters Patent. Patented June 20, 1916.

Application filed June 3, 1912. Serial No. 701,234.

*To all whom it may concern:*

Be it known that I, PATRICK R. BANNON, citizen of the United States, residing at Joliet, in the county of Will and State of Illinois, have invented certain new and useful Improvements in Flexible Rack-Bars, of which the following is a specification.

This invention relates to driving or power conveying devices and to the class of such devices that comprises pivotally connected links adapted to engage a sprocket wheel or other driven member.

The particular improvements embodied herein relate to certain elements of the conveying apparatus covered by my application for patent filed August 8, 1907, under Serial No. 387,599, and the purpose of this application is to cover by Letters Patent said elements regardless of their operative connection as it has been found they are adapted for use separate and apart from any particular form of conveying apparatus.

My present invention is made up of two distinct forms of links which complement each other in the operation of a sprocket chain or rack and are adapted for movement circumferentially on short turns and also possesses lateral flexibility.

A further object of my present invention is to provide a sprocket chain or hinged rack construction adapted to be bolted to any suitable conveying apparatus and provide an effective support therefor.

A still further object of my present invention is to provide a flexible hinged rack construction in which the rack sections or links are adapted for a partial interfolding or hinging action.

A further object of my present invention is to provide a hinged rack in which certain sections are adapted to engage a sprocket wheel so as to prevent lateral displacement of the rack or chain.

A still further object of my invention is to provide a hinged rack in which the sections are flexibly connected for movement in one direction and rigid against movement in the opposite direction.

Further objects of general utility are conserved by my invention as will be apparent to those skilled in the art.

In the accompanying drawing, which forms a part of this application, I have illustrated a preferred adaptation of my invention with the understanding that in matters of design the link sections shown may be varied materially without departure from the essential features of what constitutes my real invention.

In said drawings:—Figure 1 represents a top plan view of one of the link members which, together with other members to be described, constitute what I prefer to call for convenience in this connection, a flexible rack; Fig. 2 is a side elevation of the members shown in Fig. 1; Fig. 3 is a bottom plan view of said member; Fig. 4 is a top plan view of two members which constitute in effect, a compound link adapted to coöperate with the form of link shown in Figs. 1 to 3 inclusive; Fig. 5 is a side elevation of said compound link; Fig. 6 is a bottom plan view of said link; Fig. 7 is a top plan view of the compound link showing the lateral flexibility of same; Fig. 8 is a fragmentary view of two pivotally connected links of the form shown in Figs. 1 to 3, and Fig. 9 is a fragmentary view in side elevation, showing the relative flexibility or hinging action of two of the pivotally connected links of the form shown in Figs. 1 to 3 and in Fig. 8.

Referring particularly to Figs. 1 to 3 of the drawing, 10 represents generally a link member of my improved flexible rack, the same consisting of a single casting of a size suitable for the work required of the completed rack. Near the right hand end of the link, as shown in the drawing, are two lateral extensions or wings $10^a$, which lie in the same plane as the body portion of the link and which terminate at their extremities in lugs $10^b$ which are at right angles to the plane of said extensions and have formed therein eyes $10^c$. Extending longitudinally from the body of the link midway between the lugs $10^b$ and equally spaced therefrom, is a central lug $10^d$ in which is formed an eye $10^e$ in alinement with the eyes $10^c$ of the lugs $10^b$. At the opposite end of the link are lateral extensions $10^f$ which correspond in general form and arrangement to the extension $10^a$, and terminate in opposed spaced lugs $10^g$ provided with alined eyes $10^h$. From opposite edges of the central portion of the body of the link extend laterally lugs $10^i$. Through these lugs and through the extensions $10^a$, $10^f$, are holes $10^j$, through which attaching bolts or rivets may be inserted if it be desired to connect the link with a conveyer or other member with which the rack is to be used, such other member or device not being shown as same forms no part of this invention.

For convenience in description, the portion of the link to which the reference character 10 is applied, may be considered as the bed of the link and connected with this bed by a series of ribs 10$^k$, is the rack portion of the link, the same consisting of parallel side members 10$^L$ which are spaced apart, and connected by a plurality of teeth 10$^m$. The side members 10$^L$ are connected with the lugs 10$^b$ by inclined ribs 10$^n$, and extending downwardly from the central lug 10$^d$ is a vertical rib 10$^p$ which is intersected by a series of teeth 10$^q$ which are in longitudinal alinement with the teeth 10$^m$ on the body of the link but which are not so long, being limited in length to the thickness of the central lug 10$^d$, said rib and teeth being clearly shown in Figs. 2 and 3. At the opposite end of the link and depending from the extremities of the lugs 10$^g$, are teeth 10$^r$ and inwardly from said teeth depend other teeth 10$^s$. The teeth 10 $m$, $q$, $r$, and $s$, are all pointed and have convex sides and terminate in the same horizontal plane. The central rib 10$^p$ at the right hand end of the link serves to stiffen this portion of the link and also to reinforce the teeth 10$^q$.

Referring to Figs. 8 and 9 of the drawing, it will be seen that when two links of the pattern shown in Figs. 1 to 3 inclusive, are pivotally connected at their respective ends by a pivot 17, that such connection permits the hinging action of said links as shown in Fig. 9, and in such movement the central lug 10$^d$ with its integral teeth 10$^q$ will move in the opening 10$^t$ formed between the lugs 10$^g$ and their integral teeth 10$^r$.

It will be obvious that this pivotal or hinging action of these links will permit a rack made up of such links to travel around a sprocket wheel of relatively small diameter provided, of course, sufficient teeth of the sprocket engage the intervals between the teeth of the links to maintain the latter in operative engagement with the sprocket.

To provide for the lateral flexibility of a rack constructed according to my invention I have invented the link shown in Figs. 4 to 7 inclusive. Referring to said figures, 11 represents the body portion of one member of this compound link, from the lateral edges of which extend wings 11$^a$ which terminate at their extremities in lugs 11$^b$ which are spaced apart by an interval 11$^t$ and are provided with alined eyes 11$^c$. This member is also provided with depending ribs or flanges 11$^e$ which are connected with the bed of the link by ribs 11$^d$, and between these ribs are a series of teeth 11$^f$, the ends of which join with the ribs 11$^e$. The portions of the ribs 11$^e$ alining on opposite sides of the opening 11$^t$ are provided with short teeth 11$^g$ and at the extremities with teeth 11$^h$. On the upper face of the bed of the member 11 are cast spaced lugs 16 which surround an opening 15$^a$ adapted to receive a bolt 15 for a purpose to be disclosed. The other member of this compound link is represented by the reference character 12, and is provided with the lateral extensions 12$^a$, with terminal outer lugs 12$^b$ having eyes 12$^c$ and with a central lug 12$^d$ having an eye 12$^e$ which alines with the eyes 12$^c$ in the lugs 12$^b$. This member is formed at its opposite end with a curved shoulder 12$^h$ from which extends horizontally a circular extension 12$^g$. This member is also provided with depending ribs 12$^i$ which are connected with the lugs 12$^b$ by an inclined rib 12$^j$, and between said ribs, are teeth 12$^k$, 12$^L$, and vertical rib 12$^m$, all of which correspond to the construction, and function shown at the right hand end of the link 10 shown in Figs. 1, 2, etc.

The abutting ends of the members 11, 12, are formed with correspondingly curved portions 11$^i$, 12$^h$, which are concentric with a bolt 14 which passes through suitable openings provided therefor in the extension 12$^g$ and in the bed of the member 11, and is supplied with a nut 14$^a$ on its lower end. Said bolt passes through a boss 11$^n$ on the member 11, which forms the pivotal connection between the members 11, 12. To strengthen this connection and at the same time to permit lateral relative movement between said link members, I provide a truss bar 13 through the center of which the bolt 14 passes, and the arms 13$^a$ of said bar bear respectively on the base portions of the link members 11, 12, as clearly shown in Figs. 4, 5, and 7. One end of this truss is adapted to fit between the lugs 16 on the member 11, and is provided with an opening to receive the bolt 15 above described, thus preventing displacement of said bar upwardly and laterally and therefore holding the bar in longitudinal alinement with the rack regardless of the lateral movement of the member 12 and the circumferential movement of the compound link made up of said members 11, 12.

In constructing a rack from the link members described, I will use the compound links at predetermined points in the rack, the frequency of such use in a certain rack depending upon the work to be performed and therefore the degree of the lateral flexibility required.

It will be obvious that a rack bar composed entirely of the links shown in Figs. 1, 2, and 3, will have no lateral flexibility but is adapted for circumferential movement around a sprocket wheel or other member operatively connected therewith, while the compound link shown in Figs. 3, et seq. is adapted for both the lateral flexibility as well as circumferential movement when pivotally connected at its ends with the complementary links described.

It will be also obvious that the members of the compound link while laterally flexible relative to each other are not adapted for pivotal action in a circumferential movement.

In connecting my flexible rack-bar with a sectional platform or other structure to which it is adaptable, only the links 10 will be directly attached thereto, thus leaving the compound links 11, 12, to be supported by their pivot connections with said links 10. In assembling the members described to construct a rack-bar, the center lugs 12ᶜ at one end of the compound link will fit the opening 10ᵗ between the lugs 10ᵍ of the adjacent link 10, and the lugs 11ᵇ of the compound link will embrace the center lug 10ᵈ of the link 10 adjacent the opposite end of said compound link.

In practice, a sprocket-wheel will be used with my improved rack-bar, in which the teeth are bifurcated so as to accommodate or straddle the ribs 10ᵖ, 12ᵐ, and thereby keeping the rack in proper alinement when passing over the sprockets and preventing lateral displacement of the rack.

It will be seen that my invention has the functions of a sprocket-chain as well as those of a rack-bar. When intended for work in which the traction strains are reduced and the weight carried slight, such features as the truss-bar 13 and the ribs 10ᵖ and 12ᵐ, may be omitted and other parts made light, without departure from the essential features of my invention.

What I claim as new and desire to secure by Letters Patent, is:—

1. A flexible rack comprising two series of interposed links, each of the first series of links consisting of a bed portion, and a toothed portion integral therewith and spaced therefrom and terminating in lugs at its respective ends, and each of the second series of links consisting of two sections pivotally connected providing for their relative lateral movement independent of the first series of links, said second series of links having integral lugs on their respective ends interengaging the above said lugs, and pivots passing through said lugs, said lugs and pivots adapted to permit the respective links to travel about a sprocket-wheel while preventing the lateral movement of the first mentioned links, said second series of links being provided with means for maintaining said sections in a common plane while permitting such lateral movement.

2. A flexible rack comprising two series of interposed links, each of the first series of links consisting of a bed portion, and a toothed portion integral therewith, and having integral lugs at its respective ends, and each of the second series of links consisting of two sections pivotally connected and provided with means for maintaining said sections in a common plane, while permitting of a lateral movement between the respective sections, and pivotal means for connecting said two series of links permitting the respective links to move in a circular plane and preventing the lateral movement of the first series of links relative to the second series.

In testimony whereof I affix my signature in the presence of two witnesses.

PATRICK R. BANNON.

Witnesses:
JOHN O. BARRETT,
ROBERT J. BENTLEY.

Copies of this patent may be obtained for five cents each, by addressing the "Commissioner of Patents, Washington, D. C."